US012005925B1

(12) United States Patent
Gogna et al.

(10) Patent No.: US 12,005,925 B1
(45) Date of Patent: Jun. 11, 2024

(54) COLLABORATIVE ACTION AMBIGUITY RESOLUTION FOR AUTONOMOUS VEHICLES

(71) Applicant: Zoox, Inc., Foster City, CA (US)

(72) Inventors: Ravi Gogna, San Jose, CA (US); Arian Houshmand, Mountain View, CA (US); Paul Orecchio, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 234 days.

(21) Appl. No.: 17/463,431

(22) Filed: Aug. 31, 2021

(51) Int. Cl.
*B60W 60/00* (2020.01)

(52) U.S. Cl.
CPC .... *B60W 60/0011* (2020.02); *B60W 60/0013* (2020.02); *B60W 2520/105* (2013.01); *B60W 2520/125* (2013.01); *B60W 2540/22* (2013.01); *B60W 2554/20* (2020.02); *B60W 2556/45* (2020.02); *B60W 2720/10* (2013.01); *B60W 2720/12* (2013.01)

(58) Field of Classification Search
None
See application file for complete search history.

(56) References Cited

U.S. PATENT DOCUMENTS

| | | | | |
|---|---|---|---|---|
| 8,996,224 B1* | 3/2015 | Herbach | ............... | G05D 1/0027 701/25 |
| 9,507,346 B1* | 11/2016 | Levinson | ............. | G05D 1/0291 |
| 2015/0248131 A1* | 9/2015 | Fairfield | ............... | G05D 1/0011 701/2 |
| 2016/0139594 A1* | 5/2016 | Okumura | ............. | G05D 1/0022 701/2 |
| 2016/0370801 A1* | 12/2016 | Fairfield | ............... | G05D 1/0088 |
| 2017/0003681 A1* | 1/2017 | Ross | ................... | B60W 50/029 |
| 2017/0192423 A1* | 7/2017 | Rust | ..................... | G05D 1/0238 |
| 2019/0317512 A1* | 10/2019 | Zhang | .................. | G05D 1/0238 |

FOREIGN PATENT DOCUMENTS

WO  WO-2017139613 A1 *  8/2017

* cited by examiner

*Primary Examiner* — James J Lee
*Assistant Examiner* — Andrew Sang Kim
(74) *Attorney, Agent, or Firm* — Lee & Hayes, P.C.

(57) ABSTRACT

A teleoperations system that collaboratively works with an autonomous vehicle planning component to generate a path for controlling the autonomous vehicle to pass a situation where the vehicle is unable to identify a vehicle option to proceed and may comprise presenting one or more paths to a teleoperator (e.g., a human user, machine-learned model, and/or artificial intelligence component), such paths being generated either at the vehicle or remote system. The teleoperations system may receive input from the teleoperator indicating a vehicle option to select for the vehicle to proceed in the environment. The teleoperations system may generate a guidance path based on the vehicle options and the input and transmit the guidance path to the autonomous vehicle. Based at least in part on the guidance path, the autonomous vehicle may generate a control trajectory to use to navigate around the obstacle.

20 Claims, 5 Drawing Sheets

COLLABORATIVE ACTION AMBIGUITY RESOLUTION FOR AUTONOMOUS VEHICLES

BACKGROUND

Autonomous vehicles may rely on various path indicators such as signs, traffic signals, lane markings, cones, humans directing traffic, and/or the like to navigate. However, an autonomous vehicle may fail to navigate accurately and/or efficiently when such indicators are obscured (e.g., by snow, garbage, sand), degraded (e.g., burned out light, worn out lane markings), ambiguous (e.g., not readily apparent how the vehicle should proceed), and/or a decision is needed for the autonomous vehicle to proceed by following one of several options.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Autonomous vehicles navigate through an environment using sensor data to detect objects in the environment to safely traverse along a planned path. In some examples, the autonomous vehicle may encounter an obstacle that it is unable to safely or efficiently traverse on its own. In such cases, the vehicle may request assistance from a remote assistance system to navigate past the obstacle that impedes its progress. In some instances, multiple candidate paths may exist to navigate past an obstacle (e.g., such as an object in the road or a construction zone) and the sensor data of the environment may not provide sufficient information or context for the vehicle to confidently identify a preferred path (e.g., on which side to pass the object). In such examples, the autonomous vehicle may be unable to accurately and efficiently navigate through the environment and may cause delays or slowdowns to the autonomous vehicle and/or the surrounding traffic. The systems and techniques described herein provide for a remote assistance system (e.g., a teleoperations system) to collaboratively identify a side of the obstacle for the autonomous vehicle to pass and to generate a guidance path to assist the autonomous vehicle to efficiently navigate around the obstacle.

Techniques for a teleoperations system that collaboratively works with an autonomous vehicle guidance system to identify a side or region adjacent an obstacle and to transmit a guidance path for controlling the autonomous vehicle are described herein. In some examples, the autonomous vehicle system may request input from the teleoperations system to resolve other ambiguous or difficult situations such as identifying drop-off locations, parking locations, determining when to stop or proceed in ambiguous situations, or choose among multiple options where no clear solution is present or decipherable by the autonomous vehicle system alone, such as when multiple potential options are equally weighted, have equal costs, or equal probabilities. Although described herein with respect to identifying a side of an obstacle to pass, the description herein provides a solution to resolve any of the above-mentioned ambiguous or difficult-to-navigate situations. The techniques may include identifying one or more candidate paths to pass by the obstacle. In some situations, multiple different candidate paths may be available to pass by the obstacle. In some instances, there may be no clearly preferred path among the multiple different candidate paths (e.g., a confidence or other metric is not more than or equal to a threshold metric from another solution). In that case, the teleoperations system may prompt a teleoperator (e.g., a human user, machine-learned model, or artificial intelligence component) to provide input regarding a side on which to pass the obstacle (e.g., a left or right side of the obstacle). The input regarding the side on which to pass the obstacle may be used by the teleoperations system to generate a guidance path which may be transmitted to the autonomous vehicle. The selection of the side may include a selection of a point adjacent to a left or right side of the obstacle, a selection of a left or right-bound path, a selection of an area left or right of an imaginary line connecting the autonomous vehicle with the obstacle, or other such identification of whether to pass around the left or right side of the obstacle. The teleoperator may be remote from the vehicle and may be responsible for monitoring a plurality of vehicles. The transmission from the autonomous vehicle may include the side association, the path itself, and/or an identifier associated with a side of the obstacle, any of which may be used by the autonomous vehicle to determine a control path (e.g., a path used by the vehicle for autonomous navigation). In a first example, the autonomous vehicle may generate a path based on the side association and one or more possible paths through the side identified by the teleoperator, although in some examples, the autonomous vehicle may receive a guidance path from the teleoperator including a side on which to pass the obstacle. In some examples, the autonomous vehicle may use the guidance path as an input to the planner component to determine control trajectories to use to control the autonomous vehicle to navigate around the obstacle. Additional examples of how to generate guidance, and how a planner component of a vehicle may use the guidance are discussed in more detail in U.S. patent application Ser. No. 16/517,506, filed Jul. 19, 2019, and U.S. patent application Ser. No. 16/872,284, filed May 11, 2020, both of which are incorporated by reference in their entireties.

The techniques may be triggered by the autonomous vehicle sending a request for assistance to the teleoperations system. In some examples, the vehicle may send a request for assistance when multiple different candidate paths are available to pass by an obstacle and there is no clearly preferred path among the multiple different candidate paths or when a cost associated with the multiple different paths may be equivalent or within a predetermined threshold of one another. For instance, a cost associated with each candidate path may be substantially similar (e.g., within a threshold of one another). The cost associated with each candidate path may be based on one or more criteria such as length of the candidate path, travel time for the vehicle to traverse the candidate path, confidence or uncertainty associated with the candidate path, energy required to traverse the candidate path, magnitude of acceleration associated with the candidate path, passenger comfort cost associated with the candidate path, or any other criteria associated with operating the vehicle. In some examples, a request for assistance may be triggered in response to a vehicle planning component changing or alternating between planned paths around the object a threshold number of times and/or within a predetermined time period, which may manifest the equivalent cost of the multiple different paths.

In some examples, the request may include sensor data, such as camera image data, lidar data, radar data, location data, etc. from one or more sensors of the vehicle. In some examples, the request may additionally or alternatively include one or more candidate paths around an obstacle generated by the autonomous vehicle. In some examples, one or more candidate trajectories may be generated at the teleoperation system in addition to or instead of at the autonomous vehicle.

In some examples, a path generation component at the teleoperations system may be a same path generation component and/or use the same path generation logic as a path generation component running on the autonomous vehicle, although in additional or alternate examples, the path generation component accessible to the teleoperations system may be a dedicated hardware component and/or a more computationally-expensive path generation component than that running on the vehicle.

In other words, in a first example, path generation may occur at both the autonomous vehicle and the remote computing device using the same or similar logic, where the paths generated are the same or substantially the same using the input of the side association. In a second example, path generation may occur, using the side association, at both the autonomous vehicle and the remote computing device but paths generated at the remote computing device may be additional to or different than the paths generated at the autonomous vehicle due to more complex computation at the remote computing device (e.g., due to different hardware and/or software available to the remote computing system). In a third example, path generation may occur at the autonomous vehicle at first but then may exclusively occur at the remote computing device after the request is transmitted by the autonomous vehicle until a reply is received from the remote computing device, at which time the autonomous vehicle continues path generation (e.g., the path generation may incorporate or be based on the reply from the teleoperations device). For example, the path generation may be performed at the autonomous vehicle until the alternating behavior is noted with respect to the path, where the path switches sides of an obstacle to navigate around in less than a threshold period of time. In response to the alternating behavior, the request may be generated that causes the remote computing device to handle path generation until the side association is completed by the teleoperator, at which point the path generation returns to the autonomous vehicle. In at least one example, the autonomous vehicle can continue to generate paths after the request is sent to the remote computing device and any reply(ies) received from the remote computing device, including paths and/or side associations, may be used as part of the path generation process at the vehicle. In other words, the control path determined by the autonomous vehicle may be different than the guidance path received from the remote computing device since the autonomous vehicle may use the guidance path as part of the path generation process instead of implementing the guidance path itself as a direct command.

The techniques discussed herein may allow the autonomous vehicle to send a request to teleoperations and receive the side association and/or a path including a side association from teleoperations without needing to bring the autonomous vehicle to a stop. The vehicle may otherwise be required to stop because, for example, the vehicle may not be able to determine a favorable path using its onboard capabilities or may continue to switch between alternate paths on opposite sides of the obstacle. Due to the limited input required from the teleoperator, to select a side of the obstacle after receiving the sensor data, the teleoperator may perform the selection without stopping or slowing the operation of the autonomous vehicle. Other techniques of teleoperations assistance, such as teleoperator path drawing or other methods may require the autonomous vehicle to come to a stop or to slow to send the request to teleoperations and/or to await the teleoperator input. In some examples, the techniques described herein may enable teleoperation assistance to an autonomous vehicle moving at higher rates of speed, such as highway speeds. In the examples described herein, the teleoperations system does not directly control the vehicle, but instead provides high-level recommendations or signals that are weighted for consideration and implementation by the autonomous vehicle system. In some examples, the situations encountered and resolved by the autonomous vehicle system and the teleoperations system may be used to train and improve the autonomous vehicle system. For instance, in a situation repeatedly encountered by a fleet of autonomous vehicles where the teleoperations system repeatedly selects or recommends a same course of action, the autonomous vehicle system may be trained to resolve such situations without input from the teleoperations system. These improvements may increase the safety of the autonomous vehicle, improve the passenger experience, increase the number of scenarios that the autonomous vehicle may navigate without needing to stop for more involved teleoperator input, and/or reduce the amount of teleoperator time needed to provide guidance to vehicles. In some examples, the techniques may allow a smaller and/or less computationally-expensive path generation component to be stored/executed on the autonomous vehicle, thereby freeing up storage space and/or computation cycles.

Example Scenario

Figure 1:
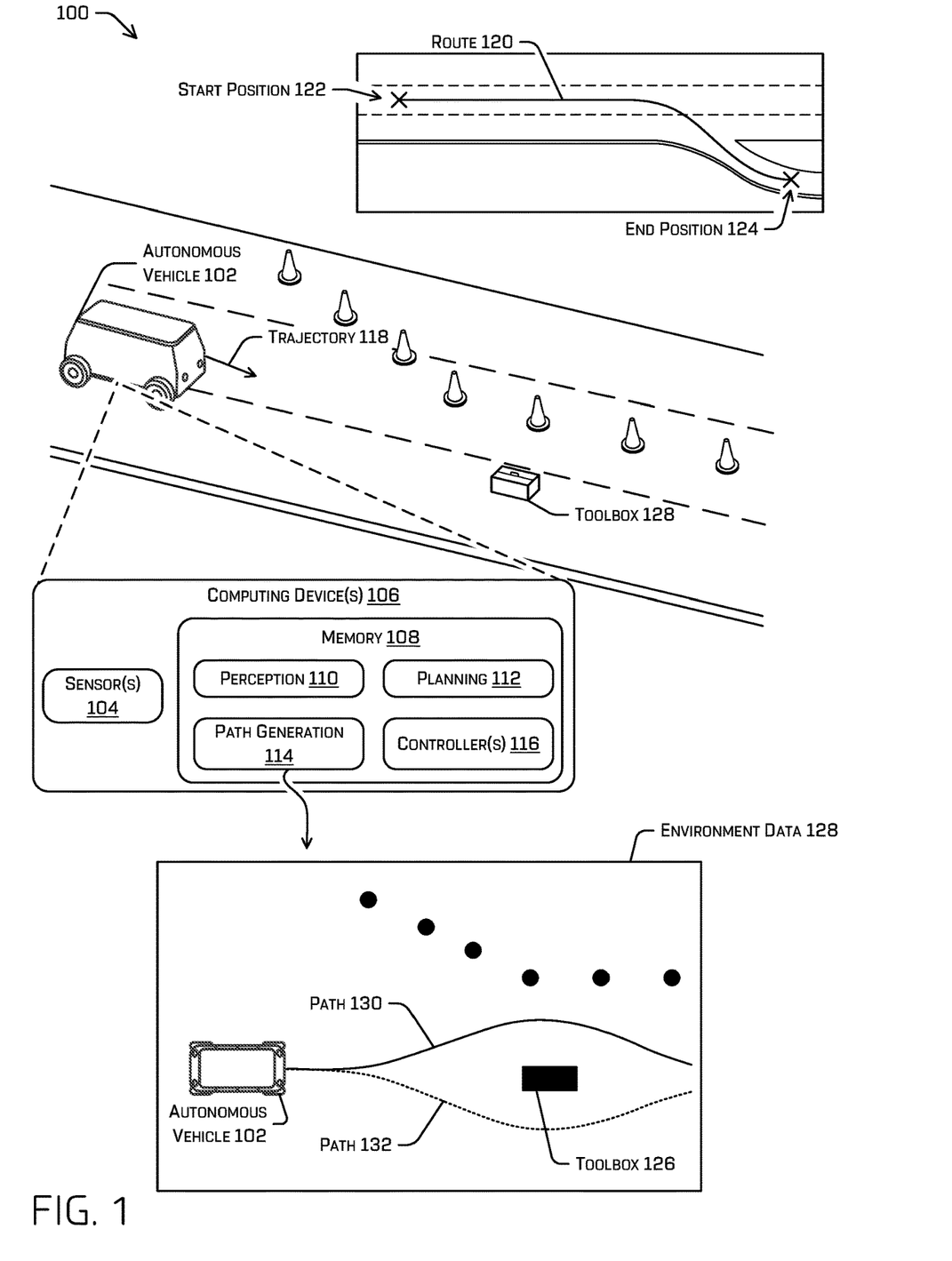
FIG. 1 illustrates an autonomous vehicle and an example scenario in which lane references (whether previously mapped or detected) may not be reliable for determining instructions for controlling motion of the vehicle.

FIG. 1 illustrates an example scenario 100 including a vehicle 102. Although shown and described herein with respect to selecting between multiple trajectories, in some examples, the selection of options for the autonomous vehicles may be for any number of different situations such as to select a parking location from among multiple candidate parking spaces, select a customer drop-off location from among multiple candidate parking locations, instructions to proceed or stop, and other such actions that may be performed by the autonomous vehicle. These selections may be made based at least in part on the multiple possible candidate operations having similar costs and/or uncertainties. The selections may be based on a set of potential vehicle actions without any of the vehicle actions having a confidence score meeting or exceeding a threshold score. The selections may also be based on identifying gaps or deficiencies in the perception data or perception of the environment that the vehicle 102 is operating in. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic, and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, path generation component 114, and/or controller(s) 116. In some examples, the planning component 112 may comprise the path generation component 114. The perception component 110, the planning component 112, the path generation component 114, and/or the controller(s) 116 may include one or more machine-learned (ML) models and/or other computer-executable instructions. In general, the perception component 110 may determine what is in the environment surrounding the vehicle 102 and the planning component 112 may determine how to operate the vehicle 102 according to information received from the perception component 110. For example, the path generation component 114, which may be part of the planning component 112, may determine trajectory 118 based at least in part on the perception data and/or other information such as, for example, one or more maps, localization information (e.g., where the vehicle 102 is in the environment relative to a map and/or features detected by the perception component 110), and/or a path generated by the path generation component 114.

The trajectory 118 may comprise instructions for controller(s) 116 of the vehicle 102 to actuate drive components of the vehicle 102 to effectuate a steering angle and/or steering rate, which may result in a vehicle position, vehicle velocity, and/or vehicle acceleration that tracks the path generated by the guidance system. For example, the trajectory 118 may comprise a target heading, target steering angle, target steering rate, target position, target velocity, and/or target acceleration for the controller(s) to track as part of the path. For example, the coarse path generated by the path generation component 114 according to the techniques discussed herein may indicate vehicle positions, headings, velocities, and/or entry/exit curvatures at 500 millisecond time intervals and a smooth path output by the path generation component 114 may comprise such points at a 10 or 100 millisecond interval, which may correspond to a time interval associated with the trajectory 118. In some examples, the controller(s) may comprise software and/or hardware for actuating drive components of the vehicle 102 sufficient to track the trajectory 118.

In the example scenario 100, the vehicle 102 has received and/or determined a route 120 defining a start position 122, an end position 124, and a curve between the start position 122 and the end position 124 (note that the curve comprises a straight line and/or one or more curves). For example, the planning component 112 may have determined the route 120 based at least in part on sensor data and an end position received as part of a mission (e.g., from a passenger, from a command center). As used herein, references to a "position" may comprise both a location and/or a pose (e.g., position and/or orientation/heading of the vehicle). In some examples, the route may not comprise end position 124 and may additionally or alternatively comprise a target position, such as a target lane, target relative position (e.g., 10 feet from roadway edge), target object (e.g., follow vehicle, follow passenger, move toward an individual hailing the vehicle), etc.

As the vehicle operates to reach the end position 124, the vehicle 102 may encounter a scenario like example scenario 100 in which multiple paths around an obstacle (e.g., toolbox 126) are possible and the planned path around the obstacle may alternate between opposite sides of the obstacle. The multiple paths or multiple options for proceeding may be identified by the planning component 112 described in further detail below. The alternating may include a switch between path 130 and path 132 and subsequently changing back from path 132 to path 130 within a predetermined period of time, such as within a few seconds or less than a second. Additionally, or alternatively, such paths may be generated substantially simultaneously (e.g., within technical tolerances) by some controllers when using, for example, a tree search, a sampling-based trajectory generation, etc. The alternating of the path around the obstacle may occur as a result of multiple different candidate paths that are available to pass around the obstacle with no clearly preferred path. The multiple candidate paths may be evaluated using a cost and no particular path may be preferred when the cost associated with them is equal or is within a predetermined threshold amount, such as less than ten percent or less than five percent, or less than one percent. For instance, a cost associated with each candidate path may be substantially similar (e.g., within a threshold of one another). Of course, other metrics may be used as well such as, but not limited to, a confidence (e.g., probability that the vehicle is successfully able to navigate around the event, etc.). The cost associated with each candidate path may be based on one or more criteria such as safe operation of the vehicle, adherence to policies (e.g., rules of the road or other internally specified rules/policies), length of the candidate path, travel time for the vehicle to traverse the candidate path, confidence or uncertainty associated with the candidate path, energy required to traverse the candidate path, magnitude of acceleration associated with the candidate path, passenger comfort cost associated with the candidate path, or any other criteria associated with operating the vehicle. In some examples, a request for assistance may be triggered in response to a vehicle planning component changing or alternating between planned paths around the object a threshold number of times and/or within a predetermined time period, which may manifest the equivalent cost of the multiple different paths. In some examples, the request for assistance may be generated in response to a simultaneous cost evaluation that produces equal or substantially equal (within a threshold difference) costs for multiple options for proceeding and/or results in a change in selected or preferred options over the predetermined period of time. The alternating of the path around the obstacle may also be a result of a confidence score associated with each path not meeting a confidence score threshold, which may cause the vehicle 102 to call teleoperations in response to the alternating behavior between path 130 and path 132 and/or because the confidence score associated with each of paths 130 and 132 does not meet the threshold.

In some examples, the vehicle 102 may slow or stop when the planning component 112 determines that the vehicle 102 has encountered an ambiguous situation. For example, when encountering the situation illustrated in FIG. 1, the vehicle 102 may begin to slow as it approaches the object and awaits input from the teleoperations system, or for the autonomous vehicle to resolve the ambiguity on its own as it continues to gather additional data from the sensors and perception component 110. Such slowing or stopping of the vehicle 102 may ensure that the vehicle 102 only proceeds when a safe route or options is confirmed by the system. In some examples, the vehicle 102 may slow or stop when a cost threshold for the possible options fails to meet or exceed a threshold value, indicating that no option for proceeding has sufficient confidence.

In response to the teleoperation request, a side association may be received at the autonomous vehicle identifying a side of the obstacle to pass around (e.g., the right side or the left side). The side association may then be used by the path generation component 114 and/or the planning component 112 to generate and/or select between paths 130 and 132. In some examples, the side association may be received from the teleoperations system in conjunction with a path or path for the vehicle 102 to follow. The side association identifies a side of the obstacle around which the vehicle 102 will pass. The side association may include an identification of left or right or may include a selection of a point, such as a coordinate within the environment data, a selection of an area such as a rectangular box on one side or the other of the obstacle, or indication of left or right. The path generation component 114 and/or the planning component 112 may then generate and/or select the paths 130 and 132 that pass through or intersect the side association (e.g., passes through a point, passes through a region, or pass to the left or right). In some examples, the paths 130 and 132 may be the paths that pass closest to a point rather than intersecting the point itself.

In some examples, the perception component 110 may receive sensor data from the sensor(s) 104 and determine data related to objects in the vicinity of the vehicle 102, such as the static and/or dynamic data. The depicted example of the environment data 128 comprising static and/or dynamic data is a top-down representation of such data, but any representation of the static and/or dynamic data is contemplated, such as a heat map, object classifications associated with detected objects, instance segmentation(s), semantic segmentation(s), two and/or three-dimensional bounding boxes, tracks, etc. The perception component 110 may additionally or alternatively determine route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 110 may receive as input. The perception component 110 may be configured to detect as many objects and information about the environment as possible to avoid failing to account for an event or object behavior that should be taken into account by the planning component 112 in determining the trajectory 118.

The object classifications, which may be part of the environment data 128 and determined by the perception component 110, may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data. Once/as the perception component 110 generates perception data, the perception component 110 may provide the perception data to the planning component 112 and/or the path generation component 114. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110 and/or a path received from the path generation component 114, to determine one or more paths, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; determine a smooth path from a coarse path received from the guidance system; generate, substantially simultaneously and based at least in part on the path and perception data and/or simulated perception data (which may further include predictions regarding detected objects in such data), a plurality of potential paths for controlling motion of the vehicle 102 in accordance with a receding horizon technique (e.g., 1 micro-second, half a second) to control the vehicle to traverse the route (e.g., in order to avoid any of the detected objects); and select one of the potential paths for generating a trajectory 118 of the vehicle 102 that may be used to generate a drive control signal that may be transmitted to the controller(s) 116 for actuating drive components of the vehicle 102. FIG. 1 depicts an example of such a trajectory 118, represented as an arrow indicating a heading, velocity, and/or acceleration, although the path itself may comprise instructions for controller(s), which may, in turn, actuate a drive system of the vehicle 102. In some examples, the trajectory 118 may be a part of a path 130 and/or path 132. The path 130 may comprise one or more trajectories, each of which may be associated with a different segment of time or distance up to a time or distance horizon.

In some examples, the path generation component 114 may be a component of the planning component 112. The path generation component 114 may comprise one or more GPUs or may be communicatively coupled with one or more GPUs (e.g., via a publish-subscribe messaging system, via a data bus) and the techniques discussed herein may be parallelized and disseminated to threads of the GPUs, although it is contemplated that the techniques discussed herein may comprise at least portions that are serial.

In some examples, paths determined by the path generation component 114 may be transmitted to a teleoperations device with a request for teleoperations assistance (as well as, in at least some examples, sensor data, perception data, or other vehicle messages). The autonomous vehicle may transmit such a request to a remote computing device when the path generation component 114 fails to generate a consistent (e.g., non-alternating) path. The path generation component 114 may fail to generate a consistent path when a cost associated with the paths is uncertain or is within a threshold amount of a cost associated with another path. The failure to generate a path with a preferred cost may result in the alternating behavior and result in a request for a side association input. The request may request a side association input or may request additional path inputs from the teleoperator. According to the techniques discussed herein the vehicle 102 may continue to move and/or move at speed without stopping and still receive control path confirmation data from a teleoperator or from the on-board components while awaiting the side association information from the teleoperator. In some examples, this is accomplished by incorporating teleoperations input as part of the path generation process at the path generation component 114. For example, the path generation component 114 may continue generating and selecting paths for controlling the autonomous vehicle, e.g., according to the techniques discussed in U.S. patent application Ser. Nos. 16/517,506 and/or 16/872,284 and may use the teleoperations input as a weight or target lane/region/path.

Example System

Figure 2:
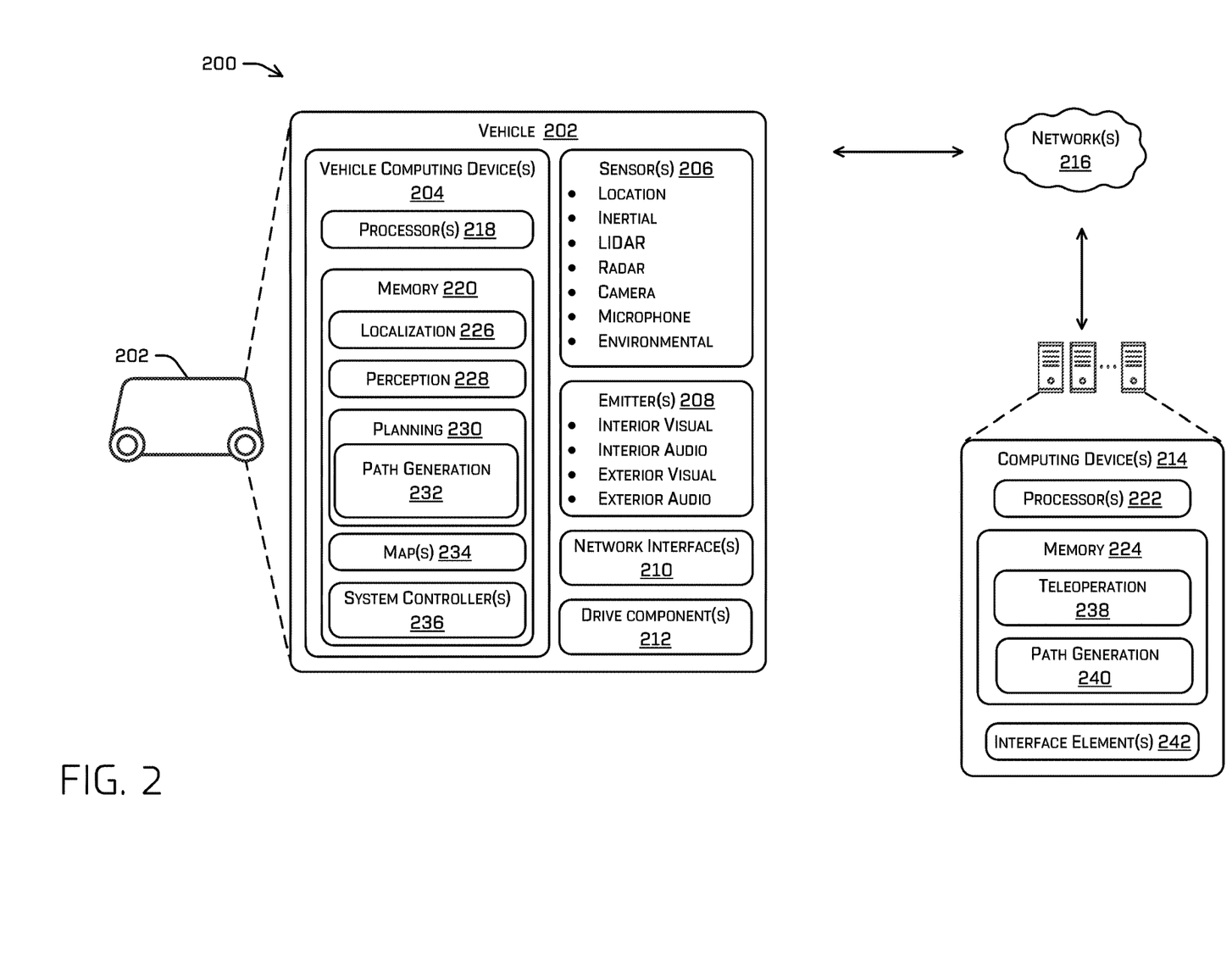
FIG. 2 illustrates a block diagram of an example autonomous vehicle architecture comprising a guidance system for collaborative path planning.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive component(s) 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processor(s) 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (A SIC s)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, path generation component 232 (which may be software and/or hardware, e.g., a portion may be hardware, such as GPU(s), CPU(s), FPGA(s), ASIC(s), and/or other processing units), map(s) 234, and/or system controller(s) 236. Perception component 228 may represent perception component 110, planning component 230 may represent planning component 112, path generation component 232 may represent path generation component 114, and system controller(s) 236 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a path and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The path generation component 232 may operate on the vehicle 202 and/or on the computing device(s) 214. In some examples, the path generation component 232 may be downstream (receive input) from at least some components of the perception component 228 and may be part of or upstream from at least part of the planning component 230 (e.g., upstream from at least a path checking component that verifies that the path will result in feasible/drivable, collision-free, and/or economic driving instructions). The path generation component 232 may be configured to pass all, part, or none of the output of the path generation component 232 to the planning component 230. In some examples, the path generation component 232 may be part of the perception component 228. The path generation component 232 may be configured to generate a coarse path which the planning component 230 may use to generate a smooth path and a path that tracks the smooth path or, in an additional or alternate example, the path generation component 232 may determine both the coarse path and the smooth path or may directly compute the smooth path. In some examples, the path generation component 232 may also be configured to compute a cost associated with multiple candidate paths to select a final path. For instance, the cost associated with each candidate path may be based on one or more criteria such as length of the candidate path, travel time for the vehicle to traverse the candidate path, confidence or uncertainty associated with the candidate path, energy required to traverse the candidate path, magnitude of acceleration associated with the candidate path, passenger comfort cost associated with the candidate path, or any other criteria associated with operating the vehicle. The path generation component 232 may operate to produce multiple path options or options for proceeding simultaneously for subsequent cost evaluation and selection of an option for proceeding.

In at least one example, the path, side association, and/or other transmission received from a teleoperation component 238 may be used by the path generation component 232 to determine a path among multiple paths and/or to complete a path around an obstacle. For example, the teleoperation component 238 may identify one or more locations to target (e.g., a side association and one or more additional points or locations) and the path generation component 240 may use the one or more locations to determine one or more paths as generated by the path generation component 240.

Memory 224 may additionally or alternatively include a teleoperation component 238 and/or a path generation component 240. Teleoperation component 238 may manage requests received from the vehicle 202 and may cause presentation, via one or more interface elements 242, of a representation of sensor data and/or perception data received from the vehicle 202 along with side association options for passing around an identified obstacle, in some cases in addition to paths generated by path generation component 232 and/or path generation component 240. In some examples, the teleoperation component 238 may determine a portion of the sensor data and/or perception data to display and/or an arrangement thereof at the interface element(s) 242.

The path generation component 240 may be the same or different than the path generation component 232. According to an example where multiple paths provide options for passing around an obstacle on opposing side, the teleoperation component 238 may receive an input selecting a side of the obstacle and/or one of the candidate paths generated by the path generation component 240 and transmit an identifier associated with that side association and/or path (e.g., a hash of instructions representing the side of the obstacle and/or path passing around that side of the obstacle, such as a hash of the velocity, heading, curvature, etc. associated with the path). In an additional or alternate example the teleoperation component 238 may receive input from a teleoperator identifying a side of the obstacle for the side association and, based at least in part on the receiving the teleoperator input, teleoperation component 238 may transmit the side association to the vehicle 202. In some examples, the path generation component 240 may, in combination with or instead of the path generation component 232, determine a cost associated with the multiple candidate paths as described above.

The interface element(s) 242 may include any interface element suitable for the type of teleoperator with which the interface is associated. For example, if the teleoperator is a human user, the interface element(s) 242 may include display(s), speaker(s), haptic feedback mechanism(s), a graphical user interface, application programming interface(s), touch input element(s), a mouse, keyboard, and/or the like. In an example where the teleoperator comprises an ML model and/or artificial intelligence component, the interface element(s) 242 may comprise an electronic communication bus, application programming interface(s), a publish-subscribe network, and/or the like.

The memory 220 and/or 224 may additionally or alternatively store a mapping system (e.g., generating a map based at least in part on sensor data), a planning system, a ride management system, etc. Although localization component 226, perception component 228, planning component 230, path generation component 232, map(s) 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, the path generation component 232, path generation component 240, and/or other components of the system 200 may comprise one or more ML models. For example, the localization component 226, the perception component 228, the planning component 230, and/or the path generation component 232 and/or 240 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as a Pixor model, in some examples.

In some examples, an ML model may comprise a neural network such as, for example, a convolutional neural network (CNN). As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure. In some examples, the path generation component 232 discussed herein and/or an ML model may comprise processor-executable instructions stored in a memory of the vehicle computing device(s) 204 and/or accessible thereto, hardware, and/or some combination thereof (e.g., a field-programmable gate array (FPGA), application-specific integrated circuit (ASIC)).

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228 and/or path generation component 232, and may validate the perception data and/or path generated by the path generation component 232, and/or transmit instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Process

Figure 3:
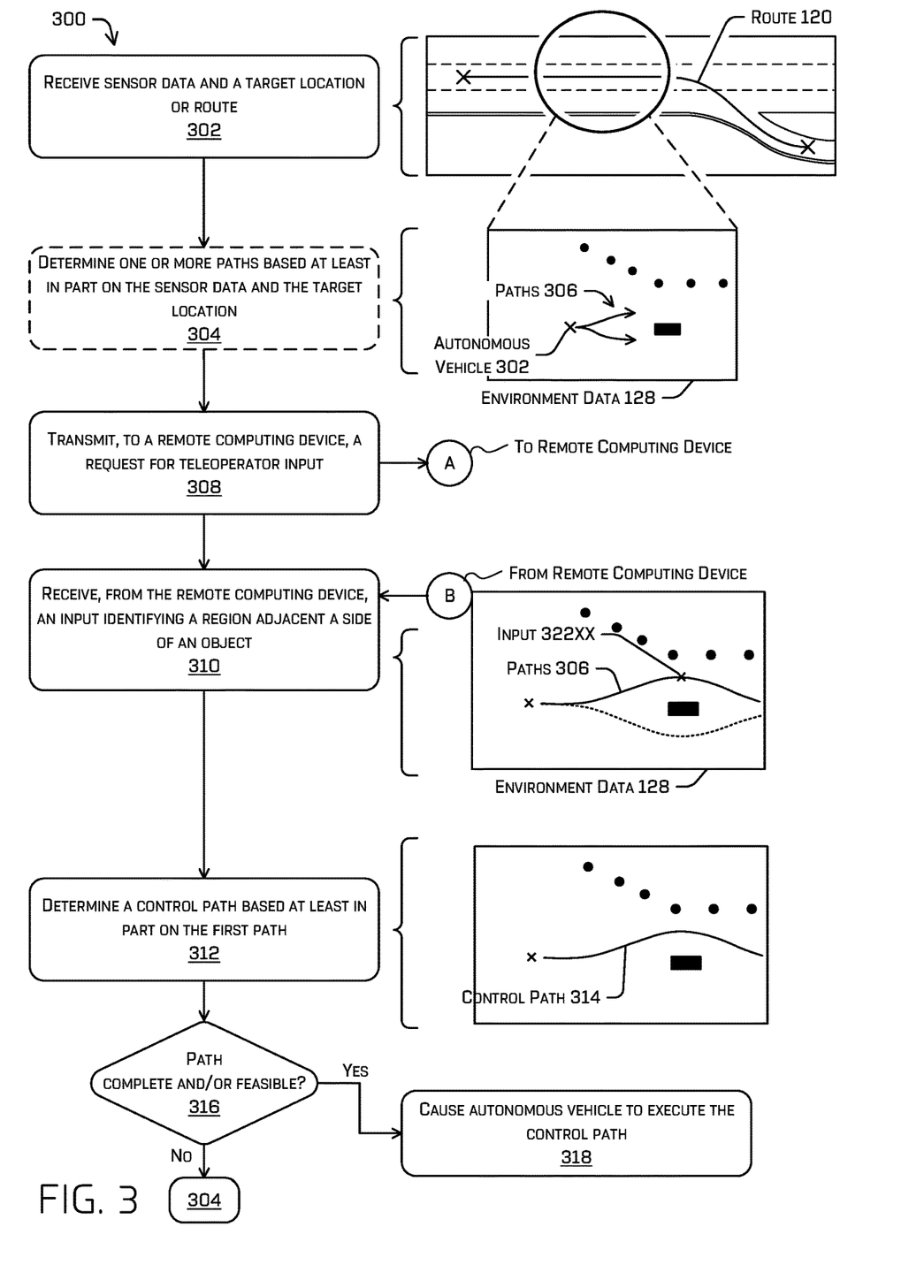
FIG. 3 illustrates a pictorial flow diagram of an example process executed at an autonomous vehicle for generating a path for controlling an autonomous vehicle.
Figure 4:
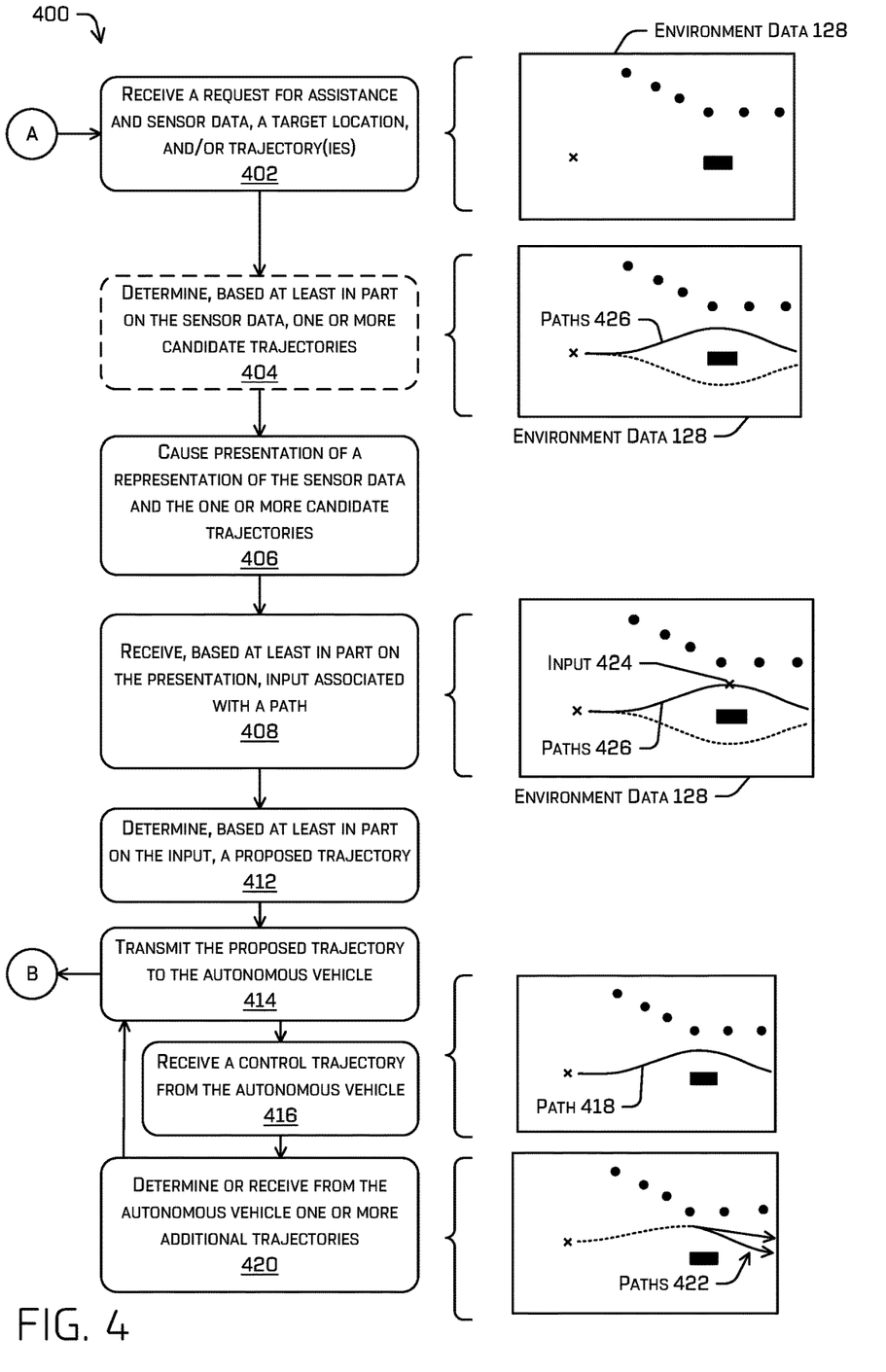
FIG. 4 illustrates a pictorial flow diagram of an example process executed at a remote computing device to collaboratively generate a path for controlling an autonomous vehicle.

FIGS. 3 and 4 illustrate a pictorial flow diagram of an example process 300 and 400 for generating a path for controlling an autonomous vehicle based on a side association around an obstacle. In some examples, example process 300 may be executed by an autonomous vehicle and example process 400 may be executed by a remote computing device (i.e., a teleoperations device) configured to receive input from a teleoperator, which may be a human user, ML model pipeline, and/or artificial intelligence component. In some examples, at least a portion of example process 300 may occur simultaneously, substantially simultaneously, and/or interleaved with operations of example process 400.

At operation 302, example process 300 may comprise receiving sensor data and a target location or route, according to any of the techniques discussed herein. For example, the sensor data may comprise lidar data, radar data, infrared image data, visual image data, sonar data, and/or the like. The autonomous vehicle may receive any such sensor data and, in some examples, may additionally or alternatively determine perception data associated with the sensor data, such as a top-down representation of the environment, such as the top-down representation of environment data 128 depicts in FIG. 3, which may represent static and/or dynamic object data. For the sake of simplicity, a single frame of environment data 128 is depicted, even though the environment data 128 may comprise multiple frames associated with different time steps depicting the predicted position(s) of object(s) in the environment associated with the autonomous vehicle.

A target location may identify a goal location, goal region, goal lane, goal orientation, and/or the like. A route 120 may comprise at least a start position and an end position associated within an environment. In some examples, the start position may identify a current pose (e.g., position and/or heading) of an autonomous vehicle and/or the end position may identify a target pose of the autonomous vehicle. The route may additionally or alternatively identify one or more curves between the start position and end position and/or a vehicle pose in association with the start position and/or end position. For example, the start position may identify a location within a first lane of a roadway and the end position may identify a location within a second lane two city blocks, a right-hand turn, and an additional city block away from the start position. In other words, the route may be a high-level mission of the autonomous vehicle. As used herein, a curve may include a straight line. Note that the vehicle's position is indicated with an "x."

At operation 304, example process 300 may comprise determining one or more paths 306 or options based at least in part on the sensor data and the target location (and/or route), according to any of the techniques discussed herein. The paths 306 are depicted as arrows in FIG. 3 and the vehicle's current position is indicated with an "x." Paths 306 may be considered candidate paths. Operation 304 is shown in a dashed box since, in at least one example, the teleoperation device may entirely generate the one or more paths once a request for teleoperator assistance has been transmitted to the remote device. Note that the request may be transmitted to the remote computing device before or after operation 304. In another example, the autonomous vehicle may determine the paths then determine to transmit the request and cease generating paths until teleoperator input is received. In yet another example, the autonomous vehicle may determine the paths and may continue to generate paths even once the request has been transmitted. The examples may enable the autonomous vehicle to continue to operate without stopping. In some examples, the system may identify objects or potential obstacles adjacent to a roadway that may cause the vehicle 102 to yield until a determination is made that the object will cross or enter the roadway, for example to yield to pedestrians or vehicles entering a roadway. In some examples the vehicle system may have errors, inconsistencies, or other issues with the perception system that result in uncertainty regarding the environment that may be resolved by a teleoperator input.

Determining the paths 306 may be based at least in part on the environment data 128 that is determined by the autonomous vehicle based at least in part on the sensor data. For example, determining the paths 306 may comprise determining a distance map wherein a location in the distance map indicates the distance from the location to a nearest portion indicated in the environment data as being occupied. Note that the distance map may be determined for each time step of dynamic data of the environment data 128, one or more of the time steps of the dynamic data, and/or an amalgamated distance map may be determined (e.g., an average of multiple distance maps). The static data of the environment data 128 and/or the dynamic data may indicate likelihoods and/or binary indications that a portion of the environment is/isn't occupied.

For example, the static data may indicate the existence of a static object by indicating a maximum likelihood (e.g., 1 in an example where the likelihoods range from 0 to 1 with 1 being a confident indication that an object exists) and the dynamic data may indicate the likely position of an object by a likelihood between 0 and 1 (non-inclusive of 1), although other systems may be used to indicate static and dynamic objects, such as using logits. In some examples, the distance map may be calculated based at least in part on filtering the environment data (i.e., the static data and/or the dynamic data) using a likelihood threshold to determine a binary mask. In other words, determining a distance may be based at least in part on the distance from a point in the environment to the nearest portion of the environment data indicating a likelihood equal to or greater than the threshold.

Operation 304 may additionally or alternatively comprise determining a confidence score associated with a path indicating a likelihood (e.g., a posterior probability) that the path is collision-free, economic (e.g., generating a cost score as described herein), and/or the like. In some examples, the confidence score may be generated by an ML model and may be based on a cost associated with the path, determined as discussed above, such as a cost based on distance, time to traverse, uncertainty, and confidence. As described herein, in some examples the confidence score may instead be replaced by a cost associated with multiple paths, with multiple paths having a cost score within a predetermined threshold such that no single path is preferred and thereby resulting in alternating behavior between multiple candidate paths. As described herein, in some examples, the confidence score of one or more paths may fail to meet or exceed a threshold, which may result in an alternating behavior for the paths that jumps between paths passing around opposite sides of an obstacle presented to the teleoperator.

At operation 308, example process 300 may comprise transmitting, to a remote computing device, a request for teleoperator input, according to any of the techniques discussed herein. In some examples, such as when the vehicle system is able to resolve the situation, for example after gathering additional data with the perception system, the teleoperation request may not be generated. The request may be generated in response to identifying an alternating path around an obstacle, such as by identifying a rapid change in a path around an obstacle switching between passing a left and right side of the obstacle. The request may also be triggered by identifying situations in which multiple solutions exist with equivalent or nearly identical confidence scores, or that the confidence scores of the multiple paths fail to meet or exceed the threshold. In some examples, the request may identify a type of request; at least part of the environment data 128, which may comprise sensor data, including a location of the vehicle determined from the sensor data; information about the vehicle; and/or the like. The request may include information or data requesting a teleoperator identify a side of an object for the path to pass the obstacle in order to resolve the alternating of the potential paths around the obstacle. In an example where operation 304 occurs, operation 308 may comprise transmitting one or more of the paths 306 to the remote computing device and requesting a teleoperator to select a path based on the side of the obstacle traversed and send the input to the vehicle for the vehicle to use as additional input to determine a path for proceeding.

At operation 310, example process 300 may comprise receiving, from the remote computing device, an input 322 identifying a side of an object, according to any of the techniques discussed herein. In a first example, the side selection may indicate a left or a right side of the object. In some examples, the input may identify a path out of several options generated by the vehicle and presented to the teleoperator, the different options passing on opposite sides of the object. In some examples the input may include a point or region selected by a teleoperator in the environment, such as in in a representation of the environment data 128 on the interface element(s). In some examples, the vehicle 302 may slow while awaiting the input from the teleoperation system, or may have slowed prior to requesting the teleoperation input (e.g., to gather additional data and attempt to resolve without the teleoperation input). The vehicle 302 may come to a stop or not proceed any further if the ambiguity is unresolved after a threshold period of time has passed or a distance traversed while slowing.

At operation 312, example process 300 may comprise determining a control path 314 based at least in part on the input 322, according to any of the techniques discussed herein. In at least one example, the control path may be one of the paths generated by the vehicle itself (e.g., one of paths 306) although in an additional or alternate example, the environment data may have been updated between the time the request was transmitted and the first path was received. Regardless, the vehicle 102 may determine the control path based at least in part on the input 322, which may provide additional information for use by the path generation component 232 to produce the path.

At operation 316, example process 300 may comprise determining whether a path comprising the control path determined at operation 312 is complete and/or feasible, according to any of the techniques discussed herein. A path may comprise a sufficient number of paths to control the autonomous vehicle from a current time and/or location up to a time horizon or displacement. For example, a path may include any number of paths sufficient to control the autonomous vehicle for the next 2 seconds, one second, 500 milliseconds, or any other time span where a time horizon is being used or for the next 10 feet, 100 feet, or the like in instances where a distance is being used. The path may be complete once paths sufficient to control the autonomous vehicle up to the horizon have been generated. If the path is complete, example process may transition to operation 318 although in at least some examples, the example process may comprise implementing the control path 314 immediately regardless of whether the path is complete. If the path is not complete or additional inputs are required by the teleoperator, for example to produce a path through a construction zone traversing around multiple obstacles, then the process 300 may return to operation 304 and continue the process 300 for all additional inputs needed.

The feasibility of the path may be checked by a validation component of the planner, as discussed in more detail in U.S. patent application Ser. No. 16/588,529, filed Sep. 30, 2019, which is incorporated herein for all purposes. If the validation component indicates that the path is invalid, example process 300 may return to operation 304, 308, and/or 312. If example process 300 returns to operation 304 or 312, example process 300 may blacklist the last path chosen and re-determine a path.

At operation 318, example process 300 may comprise causing the autonomous vehicle to execute the control path and/or path, according to any of the techniques discussed herein.

Turning to example process 400, which may be executed by the remote computing device, at operation 402, example process 400 may comprise receiving a request for assistance and sensor data, a target location, and/or paths, according to any of the techniques discussed herein. In at least one example, operation 402 may comprise receiving environment data 128, which may be streamed or otherwise transmitted form the vehicle. The target location may specify a portion of the route or the route itself may be received. In some examples, the teleoperation system may, as part of process 400, receive a notification from one or more vehicles within a fleet of upcoming potential requests for teleoperations inputs, for example as the vehicle begins to slow but prior to requesting the input, the vehicle may send a notification that a teleoperation request may be forthcoming if the vehicle is unable to resolve a situation imminently. In some examples, situations repeatedly encountered by the vehicles in a fleet may be identified and as a vehicle approaches the location of such a situation, a notification may be generated indicative of an upcoming request for input based on previous vehicle requests for input at the same geographic location.

At operation 404, example process 400 may comprise determining, based at least in part on the sensor data, one or more candidate paths 426, according to any of the techniques discussed herein. For example, the path may be received from a planning component of the autonomous vehicle. The path may indicate a current and/or target position, velocity, acceleration, heading, steering angle, and/or steering rate. The candidate paths 426 may be one or more paths generated at the vehicle, such as paths 306, or candidate paths 426 may be additional to or replace at least one of the paths 306. In some examples, the candidate paths 426 may be generated using a same component as the path generation component on the vehicle, a same software component of the path generation component run on different hardware, and/or an entirely different software and/or hardware component. For example, determining the candidate paths 426 at the remote computing device may comprise calling an application programming interface of a more complex software pipeline run by a distributed computing cluster, such as a cloud computing service. The request for assistance, as described herein, is in response to determining that inputs selecting a side of an obstacle to traverse may be needed to advance through an area, such as a construction zone, and therefore the candidate paths 426 may be the paths generated by the vehicle 102 that resulted in the request being generated.

In some examples, operation 404 may comprise receiving any of the environmental data from the vehicle, including perception data, and/or one or more paths generated by the vehicle itself. Additionally, or alternatively, operation 404 may comprise determining a proposed path based at least in part on at least one of the one or more paths generated by the vehicle.

At operation 406, example process 400 may comprise causing presentation of a representation of the sensor data and the one or more candidate paths, according to any of the techniques discussed herein. In an example, the teleoperator may view the sensor data, environmental data, and any additional information presented and may determine that a particular side of the obstacle is unfavorable for one or more reasons, such as additional obstacles, signposts in construction zones that may not be interpreted by the sensors and vehicle system, or other such reasons. In some examples, causing presentation of the one or more candidate paths may comprise causing display of an animation of the vehicle executing a candidate path, a resultant pose of the vehicle after executing a candidate path, a curve identifying a potential position of the vehicle over time according to a candidate path, and/or the like. Sufficient environment data may be presented to the teleoperator to allow the teleoperator to make provide input. In some examples, the presentation may only include representations of the environment and a request for a side association, selecting a point, region, area, or side of an obstacle to pass the path through to navigate around the obstacle.

At operation 408, example process 400 may comprise receiving, based at least in part on the presentation, input 424 identifying an input associated with a path, according to any of the techniques discussed herein. As mentioned herein, the examples and description are provided with reference to selecting a side of an obstacle to traverse, though the systems and techniques described herein serve to resolve any ambiguous or difficult situation encountered by the vehicle that the vehicle is unable to resolve, such as where the costs of multiple options for proceeding are equal, the options fail to reach a threshold level of confidence, the perception data is insufficient to provide a solution, or any other ambiguous situation. In examples where the teleoperator is a human user, the input 424 may comprise input via an input device, such as a touch screen, mouse, keyboard, microphone, or the like that identifies the side association. In an example where the teleoperator is an ML pipeline, the input 424 may be an output of the ML pipeline or may be identified by a classification output or regression output of the ML pipeline.

At operation 412, example process 400 may comprise determining, based at least in part on the input 424, a proposed path. The determination of the proposed path may be performed at the remote computing device and/or at the vehicle 102. In some examples, the input may indicate a path recommended by the teleoperation system. In such examples, the teleoperator may be able to quickly and efficiently select a path while monitoring multiple different vehicles within the fleet. In some examples, the input may provide additional data used by the vehicle to determine a path. In some examples the proposed path may be generated at both the teleoperator device as well as the vehicle. Accordingly, in some examples, the input 424 may be transmitted to the autonomous vehicle at 414 rather than the proposed path. In any event, the proposed path is generated by identifying a path that passes through the input 424 such as through a point or region identified by the input 424, and passes around the obstacle. In some examples, the input 424 may be used to eliminate options rather than to select a favorable side to pass the obstacle. In any event, the input 424 and/or a proposed path is determined for routing the vehicle around the object and resolving the alternating behavior.

At operation 414, example process 400 may comprise transmitting the proposed path to the autonomous vehicle (i.e., as the first path, as discussed above regarding example process 300), according to any of the techniques discussed herein. As discussed above, the input 424 may be transmitted in place of the proposed path and the proposed path may be generated on-board the vehicle 102 in some examples.

At operation 416, example process 400 may comprise receiving a control path 418 from the autonomous vehicle, according to any of the techniques discussed herein. For example, the autonomous vehicle may determine the control path based at least in part on the proposed path and the autonomous vehicle may transmit the control path to the remote computing device as a means of confirmation, if the path is not yet complete, and/or if an obstacle has not been passed yet.

At operation 420, example process 400 may comprise determining and/or receiving from the autonomous vehicle, one or more additional paths 422. For example, the additional paths 422 may be determined based at least in part on an end pose of the control path. In some examples, the autonomous vehicle and/or the remote computing device may determine the additional paths 422 when the path isn't complete yet and/or when an event is not yet resolved (e.g., no lane is unobstructed by an object, object(s) of a particular type are still in the roadway). Example process 400 may return to operation(s) 408 and/or 414 as necessary until the autonomous vehicle generates an indication that the need for teleoperator assistance is over, until the teleoperator provides input indicating a termination to the input, and/or until the event resolves.

Example Collaborative Path-Building

Figure 5A:
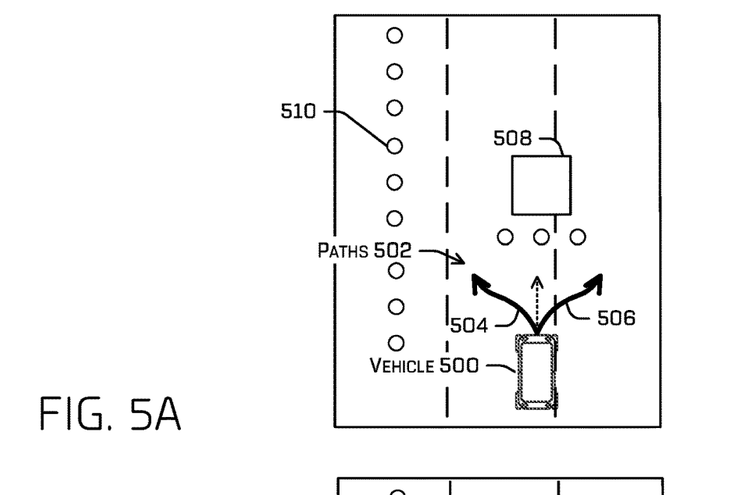
FIGS. 5A-5C illustrate a top-down representation of an example successful collaboration between a teleoperations system and an autonomous vehicle to generate a path for controlling the autonomous vehicle.
Figure 5B:
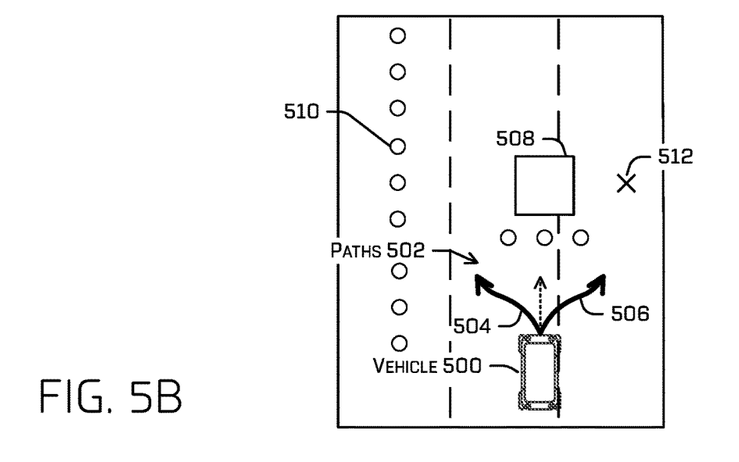
Figure 5C:
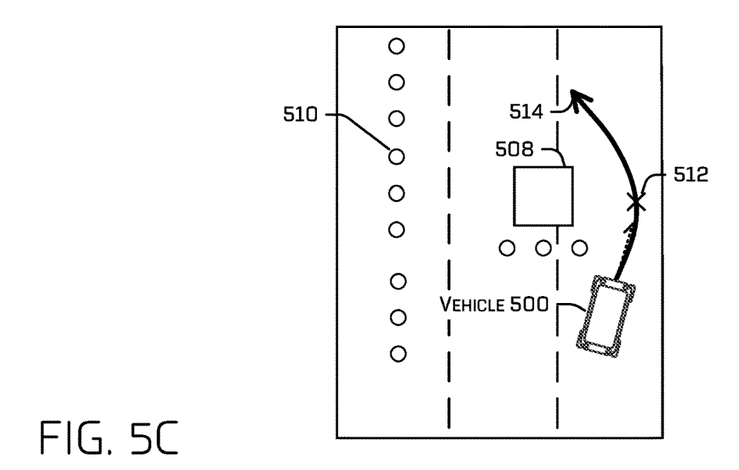

FIGS. 5A-5C depict a top-down representation of successful collaboration between a teleoperations system and an autonomous vehicle 500 to generate a path for controlling the autonomous vehicle in view of an obstacle 508 placed in the middle of a road in a construction zone with traffic cones 510 partially blocking a lane. In such an example, the autonomous vehicle 500 may transmit the request to teleoperations because the autonomous vehicle 500 needs to pass around the obstacle 508 to continue through the construction zone but the typical markers, such as lane lines are obscured and the traffic cones 510 are ambiguously placed such that it's difficult to determine whether the vehicle should pass around the right or left of the obstacle 508. In this example, a cost associated with both a left and a right side path around the obstacle may have an equal cost, or a cost within a threshold of one another. Such a situation might cause paths 502 to alternate between a left path 504 and a right path 506 as either appear to be viable options based on the sensor data. Additionally, confidence scores associated with the candidate paths generated by the vehicle may not meet or exceed a confidence score threshold, triggering a request to be sent to the teleoperations system requesting input for which side to pass the obstacle 508. FIGS. 5A-5C may depict the results of example process(es) 300 and 400. FIG. 5A depicts an autonomous vehicle 500 that has requested teleoperator assistance and the paths 502, one around the left and one around the right, that the autonomous vehicle 500 or the teleoperation system generated.

FIG. 5B depicts a potential view of the environmental data as presented to a teleoperator and indicating a selection of a side, indicated by input 512. The teleoperator may view the environmental data, sensor data, video feeds, or other such information at the display and determine that the autonomous vehicle 500 should pass the obstacle 508 on the right side. The input is shown as an "x" indicating a single point, though the selection by the teleoperator may be of the right path 506, of a region to the right of the obstacle 508, or to block off the area to the left of the obstacle 508 to exclude the left side of the obstacle from path generation.

FIG. 5C depicts the control path 514 for the autonomous vehicle 500 passing through the input 512 and passing the autonomous vehicle 500 around the obstacle, resolving the ambiguity presented by the scenario and allowing the vehicle to continue to travel. In some examples, the control path 514 may comprise paths that may be different than the paths indicated by the teleoperations system since the autonomous vehicle may use such paths a part of the process for generating control paths. The control path 514 therefore uses the inputs 512 and generates the control path 514 using the additional information gathered from the teleoperator.

Example Clauses

The following paragraphs describe various examples. Any of the examples in this section may be used with any other of the examples in this section and/or any of the other examples or embodiments described herein.

A. A method comprising: receiving, from an autonomous vehicle and at a device remote from the autonomous vehicle, a request for assistance comprising at least two paths for the autonomous vehicle to navigate relative to an object in an environment proximate the autonomous vehicle; displaying, at the device, a representation of the environment and the object; displaying, at the device, a representation of the at least two paths; receiving, at the device, input identifying a region in the environment adjacent to the object; determining, based at least in part on the input and the at least two paths, a guidance path; and transmitting the guidance path to the autonomous vehicle.
- B. The method as paragraph A recites, wherein receiving the input identifying the region in the environment comprises receiving input associated with a point in the environment on a left side or a right side of the object with respect to a point-of-view of the autonomous vehicle.
- C. The method as paragraph A recites, wherein receiving the input identifying the region in the environment comprises receiving an input selecting one of the at least two paths.
- D. The method as paragraph A recites, wherein a first path of the at least two paths differs from a second path of the at least two paths, the first path associated with a cost that is within a threshold cost associated with the second path.
- E. A system comprising: one or more processors; and a memory storing processor-executable instructions that, when executed by the one or more processors, cause the system to perform operations comprising: receiving, at a device remote from an autonomous vehicle, a request for assistance comprising at least two vehicle options for the autonomous vehicle to proceed relative to an environment proximate the autonomous vehicle; displaying, at the device, a representation of the environment; displaying, at the device, a representation of the at least two vehicle options; receiving, at the device, input identifying a vehicle option of the at least two vehicle options; and determining a guidance path for the autonomous vehicle based at least in part on the at least two vehicle options and the input.
- F. The system as recited in paragraph E, wherein the at least two vehicle options comprise at least two candidate paths.
- G. The system as recited in paragraph F, wherein receiving the input comprises receiving an input selecting a candidate path from the at least two candidate paths.
- H. The system as recited in paragraph E, the operations further comprising: transmitting an instruction to the autonomous vehicle to reduce a speed of the autonomous vehicle prior to determining the guidance path.
- I. The system as recited in paragraph E, the operations further comprising determining, based at least in part on sensor data from the autonomous vehicle, the at least two vehicle options.
- J. The system as recited in paragraph E, wherein a first cost associated with a first vehicle option of the at least two vehicle options is within a threshold of a second cost associated with a second vehicle option of the at least two vehicle options.
- K. The system as recited in paragraph J, wherein the first cost and the second cost are determined based on at least: a safety factor of the at least two vehicle options; an acceleration factor for the at least two vehicle options; a vehicle policy standard; and a passenger comfort factor.
- L. The system as recited in paragraph E, wherein receiving the input identifying the vehicle option comprises receiving an indication of a point within the environment, wherein determining the guidance path comprises selecting a vehicle option of the at least two vehicle options based on the indication of the point.
- M. The system as recited in paragraph E, wherein receiving the request for assistance is based at least in part on a number of changes in a selected vehicle option over a predetermined time period.
- N. The system as recited in paragraph E, wherein receiving the input comprises receiving an input indicating an exclusion of a region in the environment, wherein the guidance path is generated to avoid the region in the environment.
- O. One or more non-transitory computer-readable media storing processor-executable instructions that, when executed by one or more processors, cause the one or more processors to perform operations comprising: receiving, at a device remote from an autonomous vehicle, a request for assistance comprising at least two vehicle options for the autonomous vehicle to proceed relative to an environment proximate the autonomous vehicle; displaying, at the device, a representation of the environment; displaying, at the device, a representation of the at least two vehicle options; receiving, at the device, input identifying a vehicle option of the at least two vehicle options; and determining a guidance path for the autonomous vehicle based at least in part on the at least two vehicle options and the input.
- P. The one or more non-transitory computer-readable media as recited in paragraph O, wherein the at least two vehicle options comprise at least two candidate paths and receiving the input comprises receiving an input selecting a candidate path from the at least two candidate paths.
- Q. The one or more non-transitory computer-readable media as recited in paragraph O, wherein receiving the input comprises receiving an input via a user interface of a computing device positioned remote of the autonomous vehicle.
- R. The one or more non-transitory computer-readable media as recited in paragraph O, wherein a first cost associated with a first vehicle option of the at least two vehicle options is within a threshold of a second cost associated with a second vehicle option of the at least two vehicle options.
- S. The one or more non-transitory computer-readable media as recited in paragraph R, wherein the first cost and the second cost are determined based on at least: a safety factor of the at least two vehicle options; an acceleration factor for the at least two vehicle options; a vehicle policy standard; and a passenger comfort factor.
- T. The one or more non-transitory computer-readable media as recited in paragraph O, wherein receiving the request for assistance is based at least in part on a number of changes in a selected vehicle option over a predetermined time period.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All the methods and processes described above may be embodied in, and fully automated via, software code components and/or computer-executable instructions executed by one or more computers or processors, hardware, or some combination thereof. Some or all the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform functions or implement abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving, from an autonomous vehicle and at a device remote from the autonomous vehicle, a request for assistance comprising at least two paths for the autonomous vehicle to navigate relative to an object in an environment detected by the autonomous vehicle,
   wherein the at least two paths received in the request for assistance represent potential planned paths generated by the autonomous vehicle and
   wherein the request for assistance is received based at least in part on a planning component of the autonomous vehicle alternating between the at least two paths at least one of a threshold number of times or within a predetermined time period;
   displaying, at the device, a representation of the environment and the object;
   displaying, at the device, a representation of the at least two paths;
   receiving, at the device, input identifying a region in the environment adjacent to the object;
   determining, based at least in part on the input and the at least two paths, a guidance path; and
   transmitting the guidance path to the autonomous vehicle to cause the autonomous vehicle to execute the guidance path.

2. The method of claim 1, wherein receiving the input identifying the region in the environment comprises receiving input associated with a point in the environment on a left side or a right side of the object with respect to a point-of-view of the autonomous vehicle.

3. The method of claim 1, wherein receiving the input identifying the region in the environment comprises receiving an input selecting one of the at least two paths.

4. The method of claim 1, wherein a first path of the at least two paths differs from a second path of the at least two paths, the first path associated with a cost that is within a threshold cost associated with the second path, and wherein the request for assistance is received based at least in part on the first path being associated with the cost that is within the threshold cost associated with the second path.

5. The method of claim 1, wherein the at least two paths are generated by the planning component of the autonomous vehicle.

6. A system comprising:
   one or more processors; and
   a memory storing processor-executable instructions that, when executed by the one or more processors, cause the system to perform operations comprising:
   receiving, at a device remote from an autonomous vehicle, a request for assistance comprising at least two vehicle options for the autonomous vehicle to proceed relative to an environment detected by the autonomous vehicle, wherein the at least two vehicle options received in the request for assistance represent potential planned options generated by the autonomous vehicle and
   wherein the request for assistance is received based at least in part on a planning component of the autonomous vehicle alternating between the at least two vehicle options at least one of a threshold number of times or within a predetermined time period;
   displaying, at the device, a representation of the environment;
   displaying, at the device, a representation of the at least two vehicle options;

receiving, at the device, input identifying a vehicle option of the at least two vehicle options;

determining a guidance path for the autonomous vehicle based at least in part on the at least two vehicle options and the input; and transmitting the guidance path to the autonomous vehicle to cause the autonomous vehicle to execute the guidance path.

7. The system of claim 6, wherein the at least two vehicle options comprise at least two candidate paths.

8. The system of claim 7, wherein receiving the input comprises receiving an input selecting a candidate path from the at least two candidate paths.

9. The system of claim 6, the operations further comprising:

transmitting an instruction to the autonomous vehicle to reduce a speed of the autonomous vehicle prior to determining the guidance path.

10. The system of claim 6, wherein a first cost associated with a first vehicle option of the at least two vehicle options is within a threshold of a second cost associated with a second vehicle option of the at least two vehicle options.

11. The system of claim 10, wherein the first cost and the second cost are determined based on at least:

a safety factor of the at least two vehicle options;

an acceleration factor for the at least two vehicle options;

a vehicle policy standard; and a passenger comfort factor.

12. The system of claim 6, wherein receiving the input identifying the vehicle option comprises receiving an indication of a point within the environment, wherein determining the guidance path comprises selecting a vehicle option of the at least two vehicle options based on the indication of the point.

13. The system of claim 6, wherein receiving the request for assistance is based at least in part on a number of changes in a selected vehicle option over a predetermined time period.

14. The system of claim 6, wherein receiving the input comprises receiving an input indicating an exclusion of a region in the environment, wherein the guidance path is generated to avoid the region in the environment.

15. One or more non-transitory computer-readable media storing processor-executable instructions that, when executed by one or more processors, cause the one or more processors to perform operations comprising:

receiving, at a device remote from an autonomous vehicle, a request for assistance comprising at least two vehicle options for the autonomous vehicle to proceed relative to an environment detected by the autonomous vehicle, wherein the at least two vehicle options received in the request for assistance represent potential planned options generated by the autonomous vehicle and wherein the request for assistance is received based at least in part on a planning component of the autonomous vehicle alternating between the at least two vehicle options at least one of a threshold number of times or within a predetermined time period;

displaying, at the device, a representation of the environment;

displaying, at the device, a representation of the at least two vehicle options;

receiving, at the device, input identifying a vehicle option of the at least two vehicle options;

determining a guidance path for the autonomous vehicle based at least in part on the at least two vehicle options and the input; and transmitting the guidance path to the autonomous vehicle to cause the autonomous vehicle to execute the guidance path.

16. The one or more non-transitory computer-readable media of claim 15, wherein the at least two vehicle options comprise at least two candidate paths and receiving the input comprises receiving an input selecting a candidate path from the at least two candidate paths.

17. The one or more non-transitory computer-readable media of claim 15, wherein receiving the input comprises receiving an input via a user interface of a computing device positioned remote of the autonomous vehicle.

18. The one or more non-transitory computer-readable media of claim 15, wherein a first cost associated with a first vehicle option of the at least two vehicle options is within a threshold of a second cost associated with a second vehicle option of the at least two vehicle options.

19. The one or more non-transitory computer-readable media of claim 18, wherein the first cost and the second cost are determined based on at least:

a safety factor of the at least two vehicle options;

an acceleration factor for the at least two vehicle options;

a vehicle policy standard; and a passenger comfort factor.

20. The one or more non-transitory computer-readable media of claim 15, wherein receiving the request for assistance is based at least in part on a number of changes in a selected vehicle option over a predetermined time period.

* * * * *